No. 857,244. PATENTED JUNE 18, 1907.
H. LEHMANN.
FEED MECHANISM FOR AUTOMATIC MAGAZINE GUNS.
APPLICATION FILED AUG. 24, 1905.

3 SHEETS—SHEET 1.

Witnesses:
J. M. Skynhoot
Jno. V. Adams

Inventor:
Hermann Lehmann
By Knight Bros.
attys.

No. 857,244. PATENTED JUNE 18, 1907.
H. LEHMANN.
FEED MECHANISM FOR AUTOMATIC MAGAZINE GUNS.
APPLICATION FILED AUG. 24, 1905.

3 SHEETS—SHEET 2.

Witnesses:
E. M. Wynkoop
Jno N Braun

Inventor:
Hermann Lehmann,
By Knight Bros.
attys.

No. 857,244.   
PATENTED JUNE 18, 1907.

H. LEHMANN.
FEED MECHANISM FOR AUTOMATIC MAGAZINE GUNS.
APPLICATION FILED AUG. 24, 1905.

3 SHEETS—SHEET 3.

Witnesses:

Inventor;
Hermann Lehmann
By Knight Bros,
attys.

UNITED STATES PATENT OFFICE.

HERMANN LEHMANN, OF MAGDEBURG, GERMANY, ASSIGNOR TO FRIED. KRUPP AKTIENGESELLSCHAFT GRUSONWERK, OF MAGDEBURG-BUCKAU, GERMANY.

FEED MECHANISM FOR AUTOMATIC MAGAZINE-GUNS.

No. 857,244.      Specification of Letters Patent.      Patented June 18, 1907.

Application filed August 24, 1905. Serial No. 275,631.

*To all whom it may concern:*

Be it known that I, HERMANN LEHMANN, a subject of the King of Prussia, German Empire, and a resident of Magdeburg, Kingdom of Prussia, Empire of Germany, have invented certain new and useful Improvements in Feed Mechanism for Automatic Magazine-Guns, of which the following is a specification.

This invention relates to automatic feed mechanisms for guns and it has for an object to provide an improved manner of constructing and of operating the cartridge lifter.

Another object is to improve the construction of and manner of feeding from the magazine.

Other and further objects will appear in the following description and will be more particularly pointed out in the appended claims.

Figure 1:
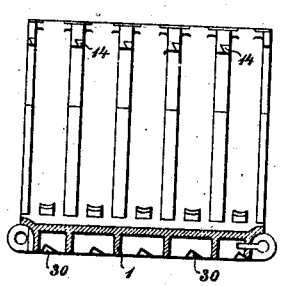
Figure 2:
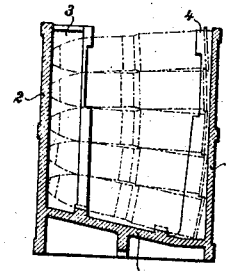
Figure 3:
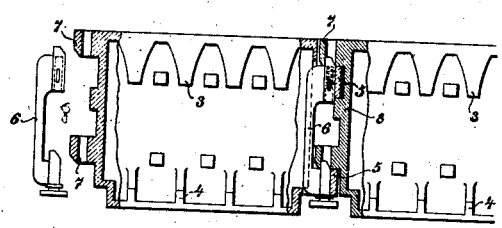
Figure 4:
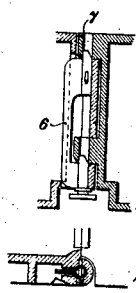
Figures 5, 6, 7:
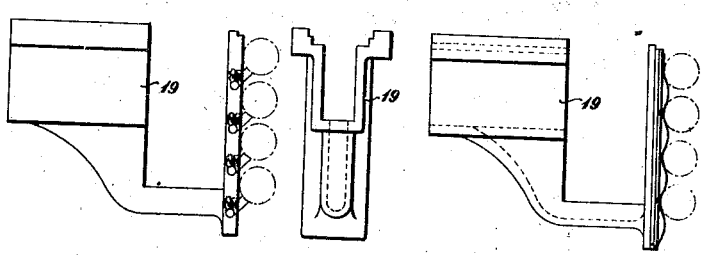
Figure 8:
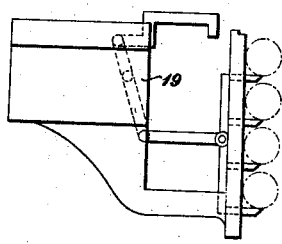
Figure 9:
Figure 10:
Figure 11:
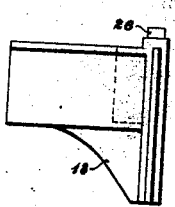
Figure 13:
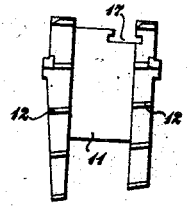
Figure 14:
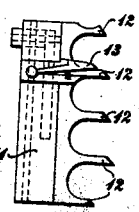
Figure 12:
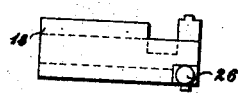
Figure 15:
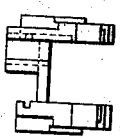
Figure 16:
Figure 17:
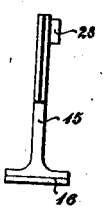
Figure 18:
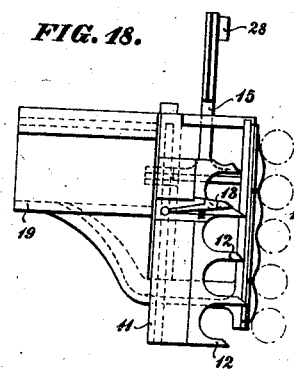
Figure 19:
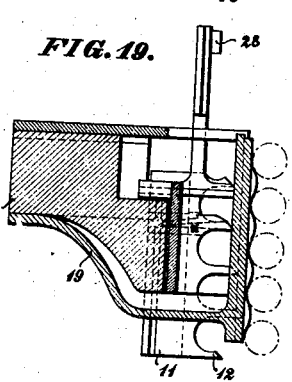
Figure 20:
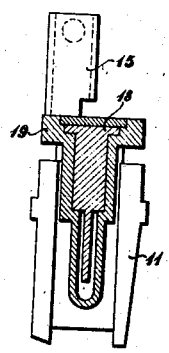
Figure 21:
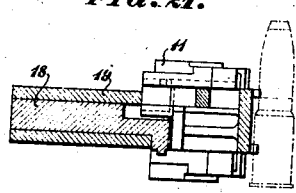
Figure 22:
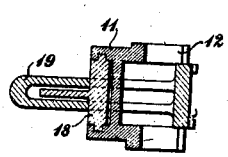
Figure 23:
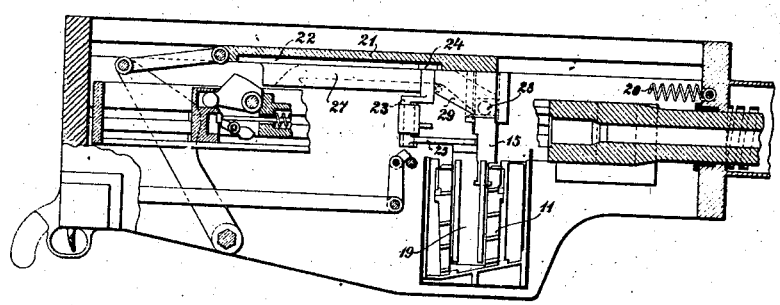
Figure 24:
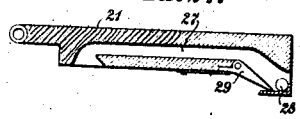
Figure 25:
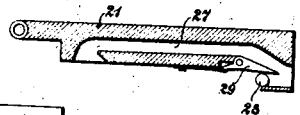
Figure 26:
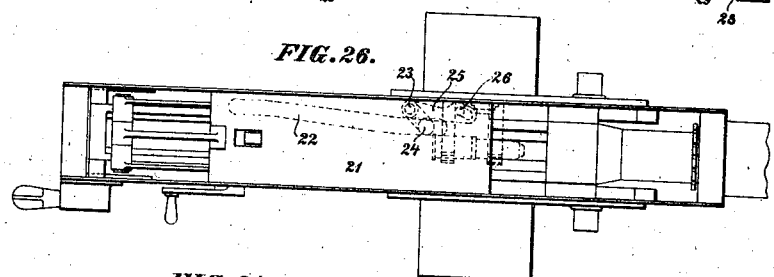
Figure 27:
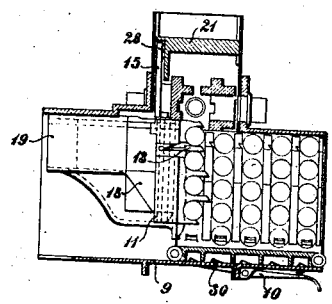
Figure 28:
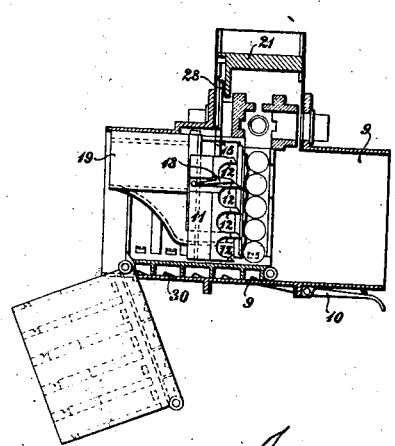

In the drawings: Figure 1 is a longitudinal section of one of the magazine-sections; Fig. 2 is a transverse section; Fig. 3 is a plan view of several magazine-sections partly in section, showing the manner of securing the magazine sections to one another; Fig. 4 shows a horizontal and a vertical section of adjacent ends of two magazine sections. Figs. 5 and 6 are detail views showing the cartridge-lifter-guide-piece in side and end elevation with one embodiment of the means for maintaining the cartridges separated; Figs. 7 and 8 are views showing two other embodiments of the means for maintaining the cartridges separated; Fig. 9 is a top plan view of the guide piece; Figs. 10, 11 and 12 are respectively end, side and top views of the horizontally movable guide piece; Figs. 13, 14 and 15 are respectively front, side and top view of the cartridge lifter; Figs. 16 and 17 are respectively side and end views of the connection between the slide and cartridge lifter; Fig. 18 is a side elevation of the parts, shown in Figs. 5 to 17, assembled; Fig. 19 is a longitudinal vertical section and Fig. 20 is a transverse vertical section of said assembled parts; Figs. 21 and 22 are horizontal sections of the said assembled parts in two different planes; Fig. 23 is a longitudinal sectional view of a gun showing my invention applied thereto; Figs. 24 and 25 are sectional views of the slide showing the groove that causes the vertical movement of the cartridge lifter; Fig. 26 is a top plan view of a gun embodying my improvements; and Figs. 27 and 28 are vertical transverse sectional views of the gun showing the feeding mechanism in two positions.

The magazine sections are each adapted to contain a plurality of parallel rows of cartridges and are each composed of a bottom 1 and side walls 2, the ends being open to permit the passage therethrough of the lifting mechanism which will be hereinafter described. To support the rows of cartridges, the magazine sections have extending from their side walls ribs or partitions 3 and 4.

Each magazine section has on one side interlocking portions in the form of perforated lugs 7 having chamfered faces and a lug 8; and on the other side interlocking portions in the form of lugs 5 which carry a coupling pin 6 which is held against turning therein and is movable axially in said lugs 5, being pressed in locking direction by a spring. In operation the interlocking portions 5 of another magazine section and the chamfered faces on the coupling pin 6 and the lugs 8 cause the pin to automatically interlock said parts by moving axially and then snapping into the perforations of the lugs under the action of its spring, the interlocking portions and the pin 6 then forming a hinged connection between the sections. The lug 8 prevents the magazine sections separating when they are outside of the magazine guide 9 as shown in Fig. 28.

The magazine sections are fed in a manner to be hereinafter described through the magazine guide 9 and in a direction transverse to the longitudinal axis of the barrel of the gun.

Depending from the top of the magazine guide 9 is a guide piece 19 (see Figs. 5 to 9) of such a size as to pass through the magazine sections. Upon this guide piece 19, a guide piece 18 (see Figs. 10 to 12) is movable horizontally or in directions parallel to the line of feed of the magazine sections. Movable vertically or transversely of the line of feed on the guide piece 18 is the cartridge lifter 11 (see Figs. 13 to 15) having a number of pairs of fingers 12 corresponding to the number of cartridges in each full row in the magazine and operating in a manner to be hereinafter described, to singly feed the cartridges from successive rows.

The horizontal movements or movements in directions parallel to the feed of the magazine of the guide piece 18 and consequently the movement of the cartridge lifter in two directions transverse of the longitudinal axis of the barrel, is produced by the following means. The gun is provided with a part movable upon the firing of the gun, this part being in the form of a slide having its forward movement produced by a spring 20. This slide 21 (see Figs. 23 to 28) is provided with a specially formed groove 22 in the bottom thereof and in which travels a roller 24 on the end of a crank shaft 23 which is journaled on the frame of the gun. Upon the other extremity of the crank shaft is a lever 25 having a slot in which works the pin 26 on guide piece 18. During the movement of the slide, rearwardly, the cartridge lifter moves in one direction and during its forward movement the cartridge lifter moves in the opposite direction. To move the cartridge lifter vertically or in two other directions transverse of the longitudinal axis of the barrel, the cartridge lifter has connected thereto a rod 15, the connection being in the form of a foot 16 on the rod and a groove 17 on the lifter to permit the lifter to move relatively to the rod in the two directions first mentioned. This rod carries a roller 28 which is directed upwardly into a groove 27 on one side of the slide by a switch 29 at the beginning of every forward movement of the slide, thereby causing the cartridge lifter to be elevated or moved in one direction, the movement in the opposite direction or downwardly being caused at the end of the forward movement by the dropping of the roller 28 from the groove 27.

The cartridge lifter fingers 12, before mentioned, are of different lengths and engage in succession between the cartridges of the nearest row and separate the cartridges to such an extent that if the cartridge shells are formed with a rim, the introduction of the uppermost cartridge into the barrel will not be obstructed by the rim of the next lower cartridge. The pair of fingers entering between the lower two cartridges of a complete row, enter first, lifting all cartridges above the lower one, and then the fingers above owing to their gradually decreasing in length, enter successively between successive cartridges, each time lifting all cartridges located above the entering finger until all cartridges become separated. If the fingers were not of different lengths or if they were equidistant from the cartridges, they would all start to enter between the cartridges simultaneously and the upper cartridges would thereby be injured.

I provide means for maintaining the cartridge in spaced relation after they have been spaced by the fingers 12. This means is movable to permit the cartridges to be fed and to hold them in their fed position. In Fig. 5 this means comprises a plurality of spring pressed dogs on the guide piece 19 yielding on pressure in one direction by the cartridges. In Fig. 7 it comprises an undulatory spring which also yields upon pressure by the cartridges. And in Fig. 8, it comprises a plurality of connected fingers which are moved automatically into engagement with the cartridges as the spacing and lifting fingers 12 move out of engagement therewith and vice versa.

After the last cartridge of a row is located on the top pair of fingers, the pawls 13 on the second pair of fingers pressed upwardly by springs and pressed downwardly by a cartridge, are able to swing upwardly. Consequently when the cartridge lifter elevates the last cartridge of a row, the pawls 13 pass behind a pair of projections 14 (see Fig. 1) on the partitions 3 and 4 of the magazine sections and when the lifter moves in the direction of movement of the magazine sections, said sections are drawn with it, thereby positioning the next row of cartridges so that they may be singly fed to the barrel.

To prevent the magazine sections moving in the direction opposite to the direction of feed, the magazine sections are provided with a plurality of notches 30 in which engage a pivoted lever 10.

The operation will be apparent from the foregoing description but may be generalized as follows: The slide 21 operates on the cartridge lifter after the breech has been opened. The lifter 11 is first moved toward the cartridges in a direction transverse of the same to enter between the cartridges, by means of the roller 24 on crank 23, traveling in groove 22 during the rearward movement of the slide. At the end of the rearward movement, the roller 28 controlling the vertical movement of the lifter is in the position shown in Fig. 24, having passed beneath switch 29 in the manner shown in Fig. 25, so that at the beginning of the forward movement of the slide, the cartridge lifter is moved to elevate the uppermost cartridge into a position to permit the breech block to feed the same into the barrel on its forward movement. During the forward movement of the slide, the lifter is moved away from the cartridges by means of shaft 23, the cartridges being supported in the manner before described, and, at the end of the forward movement, the cartridge lifter descends to a position where it can be again moved toward the cartridges. The rows of cartridges are successively fed to a position where they may be singly fed to the barrel.

By rounding off the rear end of the groove 27 and its forward end being inclined by means of the switch 29, the lifter is caused to take a path which is curved at one portion and chamfered at another. It is obvious that the lifter would also be able to effect its displacements if its path were rounded off or chamfered at all four angles, the grooves being suitably formed or disposed, or, by increasing the rounding off, making its path elliptical or circular. It is also obvious that the magazine may be guided to the barrel in any direction in addition to that illustrated.

Having thus described my invention, what I claim and desire to secure by Letters Patent is:

1. The combination of the magazine sections adapted to be hinged together and having means for supporting a plurality of rows of cartridges interlocking portions preventing movement in the direction of the axis of the hinging, and an axially movable coupling pin carried by one section for holding two sections together.

2. The combination of the magazine sections adapted to be hinged together and having interlocking portions preventing movement in the direction of the axis of the hinging, an axially movable coupling pin carried by one section for holding two sections together, and a spring acting on the pin and causing it to snap into engagement with another section when the two sections have their interlocking portions pressed together.

3. The combination of a plurality of magazine sections having interlocking portions, and means causing said sections to automatically interlock when the interlocking portions are pressed together.

4. In a gun, a plurality of magazine sections having hinged connection with one another and each having means for supporting a plurality of parallel rows of cartridges.

5. In a gun, a plurality of magazine sections having hinged connection with one another and each having means for supporting a plurality of parallel rows of cartridges, said sections being constructed to move the rows of cartridges successively to a position into which they may be singly fed into the barrel.

6. In a gun, the combination of means for supporting a plurality of parallel rows of cartridges, and automatic means for moving the row supporting means so that the rows are successively moved to a position into which they may be singly fed into the barrel.

7. In a gun, the combination of a part moving automatically upon the firing of the gun, means for supporting a plurality of parallel rows of cartridges, and means controlled by the automatically moving part and moving the row supporting means so that the rows are successively moved to a position from which they may be singly fed into the barrel.

8. In a gun, the combination with a magazine having means for supporting a plurality of rows of cartridges, of a cartridge lifter having a plurality of fingers to enter between all the members of a row of cartridges, and means moving the cartridge lifter in four directions all transverse of the longitudinal axis of the barrel.

9. In a gun, a cartridge lifter having a plurality of fingers of gradually decreasing length.

10. In a gun, a cartridge lifter having a plurality of fingers constructed to enter successively between successive cartridges of a row of cartridges.

11. In a gun, a cartridge lifter constructed to enter successively between successive cartridges of a row of cartridges, and means for moving the cartridge lifter to cause all of the cartridges in the row to move simultaneously.

12. In a gun, the combination with means for supporting a vertical row of cartridges, of means successively entering between successive cartridges beginning with the lower two, to space the cartridges.

13. In a gun, the combination with means for supporting a vertical row of cartridges, of means successively entering between successive cartridges beginning with the lower two, to space the cartridges, and means maintaining said cartridges spaced.

14. In a gun, the combination with means for supporting a row of cartridges, of means for spacing the cartridges, and means for maintaining said cartridges spaced.

15. In a gun, the combination of a cartridge lifter, having a plurality of spacing and lifting fingers, and means for holding the cartridges in spaced relation after they have been spaced by the fingers.

16. In a gun, the combination of a cartridge lifter, having a plurality of spacing and lifting fingers, and means for holding the cartridges in spaced relation after they have been spaced by the fingers, said means being movable to permit the cartridges to be fed by the fingers.

17. In a gun, the combination of a magazine constructed to support a vertical row of cartridges, and a cartridge lifter movable in four directions transverse of the longitudinal axis of the barrel and having a plurality of spacing and lifting fingers gradually decreasing in length.

18. In a gun, the combination of a magazine constructed to support a row of cartridges, a cartridge lifter movable in four directions transverse of the longitudinal axis of the barrel and having a plurality of spacing and lifting fingers gradually decreasing in length, and means for supporting the cartridges in spaced relation.

19. In a gun, the combination of a magazine constructed to support a row of cartridges, a cartridge lifter movable in four directions transverse of the longitudinal axis of the barrel and having a plurality of spacing and lifting fingers gradually decreasing in length, and means for supporting the cartridges in spaced relation, said means being movable to permit the feed of the cartridges.

20. The combination of a magazine constructed to support a plurality of parallel rows of cartridges, a cartridge lifter constructed to feed from one row at one time, and means automatically feeding another complete row to the cartridge lifter when one row has been completely fed to the barrel.

21. In a gun, the combination of the movable magazine, constructed to hold a plurality of parallel rows of cartridges, and a cartridge lifter constructed to space the cartridges of each row, and to singly feed the cartridges to the barrel.

22. In a gun, the combination of the movable magazine constructed to hold a plurality of parallel rows of cartridges, means for feeding the cartridges, and means automatically causing the movement of the magazine every time a complete row has been fed.

23. In a gun, the combination with a magazine having means for supporting a plurality of rows of cartridges, and a part moving automatically on firing, of a cartridge lifter having fingers constructed to enter successively between successive cartridges of a row of cartridges, a connection between said part and the lifter causing two movements transverse of the longitudinal axis of the barrel, and a second connection between the lifter and the automatically moving parts causing two other movements of the lifter.

24. In a gun, the combination of a magazine having means for supporting a plurality of rows of cartridges, a part moving automatically upon firing and provided with two grooves, a cartridge lifter having fingers constructed to enter successively between successive cartridges of a row of cartridges, and connection between both grooves and the cartridge lifter causing the lifter to move to and from the cartridges and move them into a position to be fed into the barrel.

25. The combination of a slidably mounted guide piece, a cartridge lifter slidable thereon, a part movable automatically upon the firing of the gun, connection between said part and the guide piece to move the latter, and connection between said automatically moving part and the lifter to move the lifter.

26. In a gun, the combination of the slide provided with two grooves, a slidably mounted guide piece, a cartridge lifter slidably mounted thereon, a connection between one of the grooves and the guide piece to cause the movement of the guide piece, and a connection between the other groove and the lifter to cause a movement of the lifter on the guide piece.

27. The combination with a movable magazine, of a cartridge lifter having one of its movements in the direction of the feed of the magazine, and means carried by one of said parts causing the magazine to move with the lifter.

28. The combination with a movable magazine, of a cartridge lifter having one of its movements in the direction of the feed of the magazine, and a dog carried by the lifter to engage the magazine and cause the magazine to move with the lifter.

29. The combination of a movable magazine constructed to carry a plurality of rows of cartridges, means for singly feeding said cartridges from a row, said means causing the movement of the magazine when a row has been fed.

30. The combination of a movable magazine constructed to carry a plurality of rows of cartridges, and a movable cartridge lifter carrying means for engaging the magazine after a row has been completely fed, to cause the magazine to move with the lifter and position another row so that a feed may take place therefrom.

31. The combination of the magazine having a plurality of partitions on opposite walls thereof, and a plurality of projections on said partitions; and a lifter movable in the direction of the feed of the magazine and provided with a plurality of fingers, and with a spring pressed dog on one of said fingers to engage a projection on the magazine to cause the magazine to move with the lifter.

The foregoing specification signed this 9th day of August 1905.

HERMANN LEHMANN.

In presence of—
WILHELM FLEISCHBACK,
MARIA SCHNEIDER.